United States Patent [19]

Chien

[11] Patent Number: 4,930,966
[45] Date of Patent: Jun. 5, 1990

[54] TIRE DISMANTLING AND SETTING APPARATUS

[76] Inventor: Kuo-Feng Chien, P.O. Box 10160, Taipei, Taiwan

[21] Appl. No.: 362,264

[22] Filed: Jun. 6, 1989

[51] Int. Cl.⁵ .............................................. B60B 31/06
[52] U.S. Cl. ...................................... 414/427; 29/273; 254/2 R; 269/17
[58] Field of Search ............... 29/426.3, 273; 414/426, 414/427, 428; 280/47.38 R; 254/2 R; 269/17

[56] References Cited

U.S. PATENT DOCUMENTS 3,145,859  8/1964  Barosko .............................. 414/427
4,042,139  8/1977  Pernsteiner et al. .................. 29/414
4,056,207  11/1977 Spilker ................................ 414/427
4,771,531  9/1988  Asher ................................. 29/426.3

Primary Examiner—Robert C. Watson

[57] ABSTRACT

A tire dismantling and setting device includes a roller holder for loading or holding tires thereon, an axle retainer pre-fixed on a car axle, a driving bolt rotatably secured on the roller holder, and a pair of tire fasteners fastening the tires on the roller holder, whereby upon a clockwise rotation of the driving bolt to urge the bolt coupled with the axle retainer against the car axle, the holder and the fastened tires can be dismantled conveniently and safely. When rotating the driving bolt counter-clockwise, the bracket, the tire fastener and the fastened tires are pushed rearwardly to be mounted on a car axle conveniently.

8 Claims, 2 Drawing Sheets

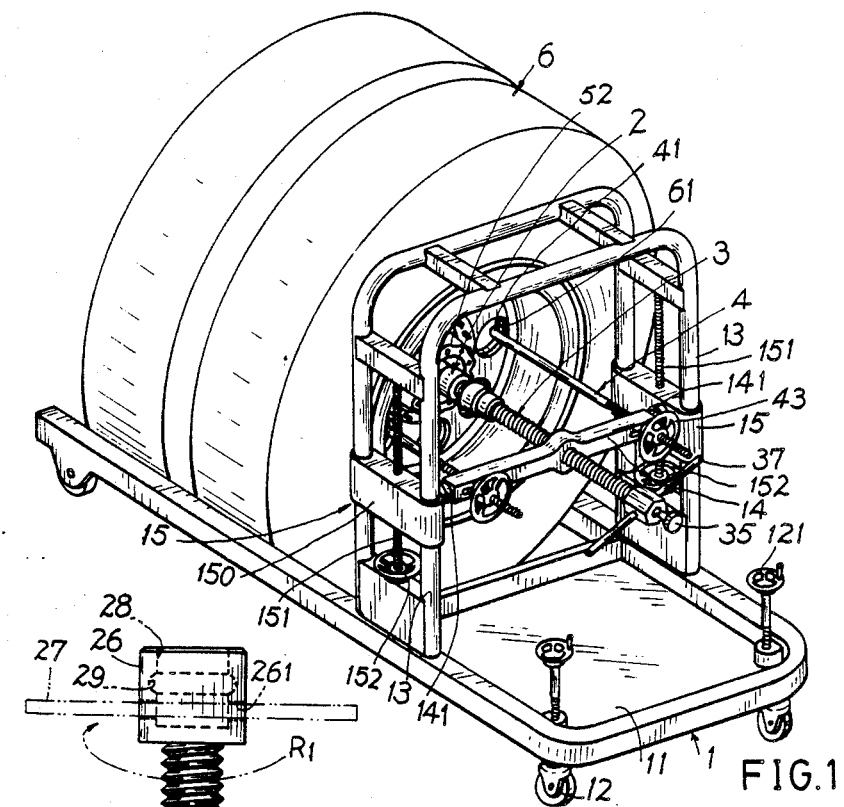
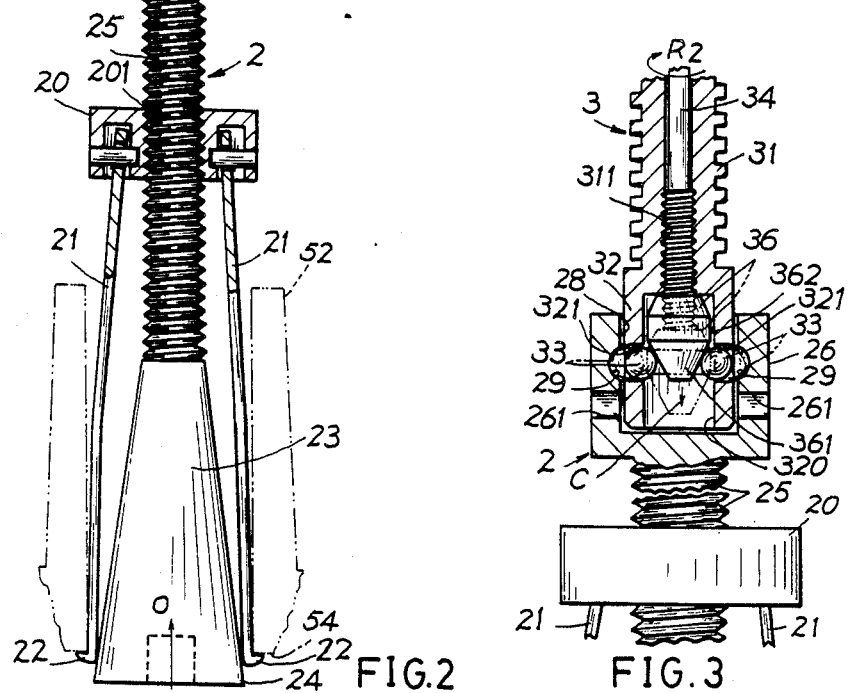

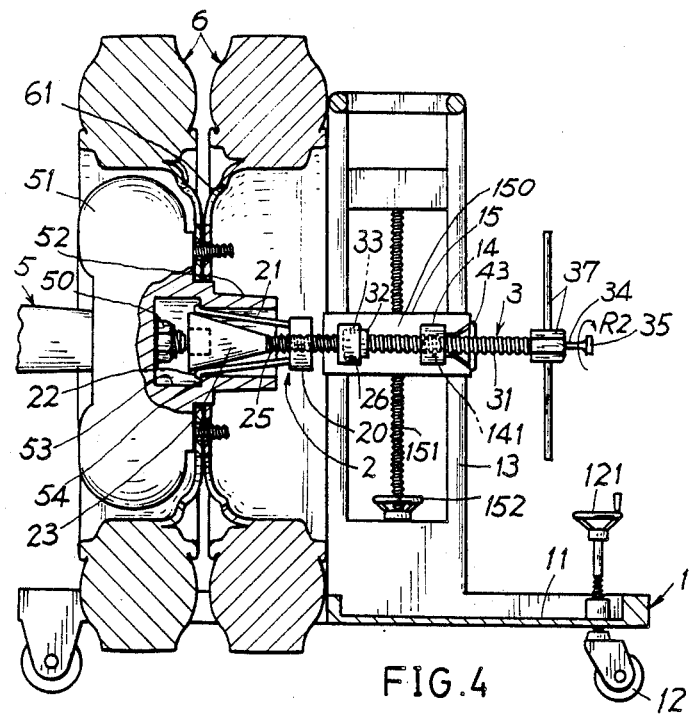
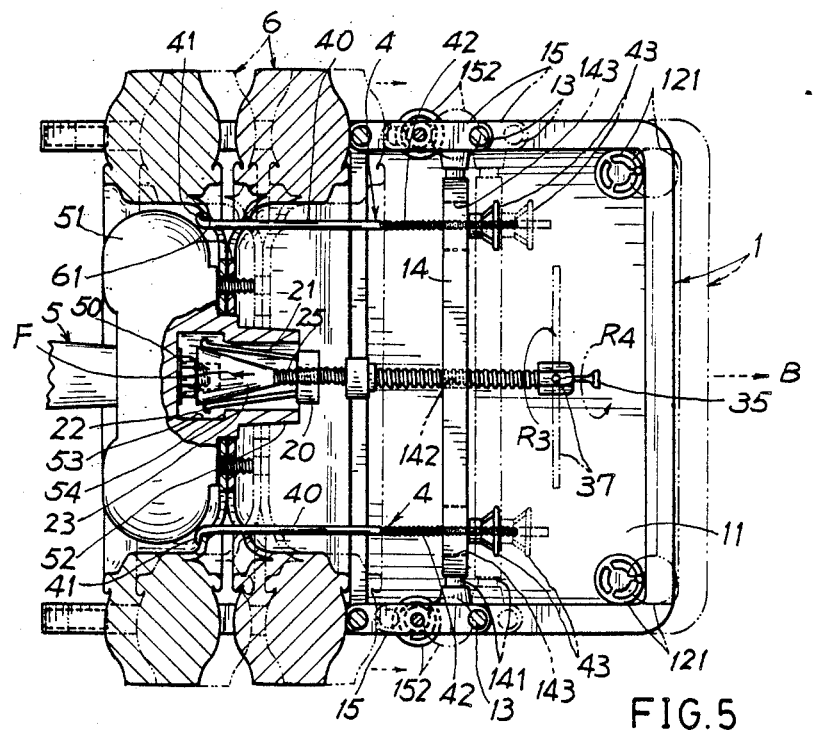

TIRE DISMANTLING AND SETTING APPARATUS

BACKGROUND OF THE INVENTION

When dismantling or setting a tire, especially a heavy tire of a truck or bus, from or on a car, it is very difficult to handle the heavy tire. If it is uncarefully held, the tire may drop or collapse to injure a worker when doing a tire maintenance job. During a dismantling work, the worker may climb under the car to push the tire outwardly in order for removing the tire, causing a very inconvenient maintenance job or possibly causing an injury accident due to a falling down of the heavy tire.

The present inventor has found the drawback of a conventional method for dismantling or assembling a tire and invented the present tire dismantling and setting apparatus.

SUMMARY OF THE INVENTION

The object of the present invention is to provide a tire dismantling and setting apparatus including a roller holder for holding the tire, an axle retainer prefixed onto a car axle, a driving bolt movably mounted on the roller holder and rotatably engageable with the axle retainer and a pair of tire fasteners fastening the wheel disk of a tire on the holder so that upon a clockwise rotation to protrude the driving bolt and the axle retainer inwardly towards the axle, the tire may be easily, stably, safely dismantled from the axle to be transferably held onto the roller holder.

BRIEF DECRIPTION OF THE DRAWINGS

FIG. 1 is a perspective illustration of the present invention.

FIG. 2 is a top-view sectional drawing of the axle retainer of the present invention.

FIG. 3 is an illustration showing a coupling of the axle retainer with the driving bolt in accordance with the present invention.

FIG. 4 is a sectional elevation of the present invention.

FIG. 5 is a top-view sectional drawing of present invention.

DETAILED DESCRIPTION

As shown in the figures, the present invention comprises: a roller holder 1 for holding tires 6 thereon, an axle retainer 2 operatively retained on or acting on an axle 5 of a car such as a truck or a bus, a driving bolt 3 movably mounted on the roller holder 1 and rotatably engageable with the axle retainer 2, and a pair of tire fasteners 4 fastening the tires 6 on the holder 1.

The roller holder 1 includes: a platform 11 having rollers 12 movably supporting the holder 1 on a floor, an U-shaped frame 13 vertically secured on the platform 11, a bolt bracket 14 pivotally mounted on the U-shaped frame 13 and a height-adjusting device 15 formed on the frame 13 for adjusting a height of the bracket 14.

The axle retainer 2 includes: a trifurcate plate 21 having its front end secured to a retainer disk 20 and having its rear end formed with trifurcate plate members each formed with a hook portion 22 engageable with a shoulder portion 54 circumferentially formed in an axle socket 53 of a wheel bolt 52 secured on an outermost end of the axle 5, a retainer screw 25 having male threads formed thereon rotatably engageable with a female-threaded hole 201 formed in the disk 20, an actuating head portion 23 formed on a rear end of the screw 25 having a truncated conical surface 24 tapered frontwardly towards the disk 20 as shown in FIG. 2, a retainer socket portion 26 formed on a front end of the screw 25 opposite to the actuating head portion 23 having a cylindrical hole 28 formed in the socket portion 26 and an annular groove 29 recessed in the cylindrical hole 28, and a retainer handle 27 detachably mounted on the socket portion 26 for rotatably driving the screw 25.

The driving bolt 3 as shown in FIGS. 3 and 4 includes: a male-threaded bolt 31 rotatably engageable with and secured in the bracket 14 which is formed with a female-threaded hole 142 therein and engageable with the bolt 31, a hollow plug 32 formed on a rear end of the bolt 31 detachably engageable with the cyindrical hole 28 of the socket portion 26 of the axle retainer 2, a plurality of balls 33 slidably held in plurality of holes 321 formed in the plug 32 and extendibly engageable with the annular groove 29 of the socket portion 26, an inner male-threaded rod 34 engageable with the bolt 31 having a coupling plunger 36 formed on a rear end of the rod 34 movably engageable with a cylindrical hole 320 formed in the hollow plug 32, a knob 35 formed on a front end of the rod 34 for driving the rod 34 for moving the coupling plunger 36 having a cone portion 361 tapered towards the socket portion 26 when engaged with the plug 32 and a cylindrical body 362 adjacent to the cone portion 361 with a perimeter slightly smaller than an inside diameter of the cylindrical hole 320 of the plug 32, and a driving handle 37 formed on a front end of the bolt 31 for driving the bolt 31.

A pair of tire fasteners 4 are disposed on two sides of the bolt bracket 14, each tire fastener 4 including a hook portion 41 formed on a rear end of a fastener rod 40 operatively secured on a wheel disk through a disk hole 61 of the tire 6, a male-threaded portion 42 formed on a front portion of the fastener rod 40 adjustably fixed in a slot 143 formed in a side portion of the bracket 14, and a fastening wheel 43 rotatably engageable with the male-threaded portion 42 for limiting a front (outer) end of the rod 40 on the bracket 14.

When using the present invention for dismantling a tire or a set of tires from a truck or bus, the trifurcate plate 21 with the actuating head portion 23 of the axle retainer 2 is first inserted into an axle socket 53 of a wheel bolt 52 as shown in FIG. 2. Upon a rotation of the retainer handle 27 to urge the actuating head portion 23 frontwardly (direction 0), the sloping truncated cone surface 24 may extend the plate members of the trifurcate plate 21 outwardly to engage each hook end portion 22 on a shoulder 54 of the axle socket 53 so as to stably fix the axle retainer 2 with the axle 5.

The roller holder 1 serving as a "tire car" is moved towards the tires 6 fixed on a brake drum or wheel bolt 52 as shown in FIG. 4 (the tire 6 being removed the bolt nuts ready for dismantling) and the hollow plug 32 is engaged with the retainer socket portion 26 of the axle retainer 2. Upon a rotation of the knob 35 in direction R2 as shown in FIGS. 3, 4 to forward the coupling plunger 36 in direction C to urge the balls 33 outwardly to engage the annular groove 29 and the ball holes 321 of the plug 32 so as to couple the plug 32 with the retainer socket portion 26. The plug 32 rotatably coupled with the retainer socket portion 26 can be freely rotated along a longitudinal axis of the bolt 3 or screw 25. Upon a longitudinal pulling or pushing of the bolt 3 and screw 25, the bolt 3 and screw 25 will not be separated once coupled by the balls 33 locked between the retainer socket portion 26 and the hollow plug 32.

The pair of tire fasteners 4 are adjusted to fasten the hook end portions 41 of the fasteners 4 on the wheel disk 6 of the tire 6. Then the driving handle 37 is rotated clockwise (direction R3) as shown in FIG. 5 to forward the bolt 3 and the coupled screw 25 rearwardly until forcing the actuating head portion 23 on an outermost nut 50 of the axle 5. The driving handle 37 is further rotated (direction R3) to force the actuating head of the axle retainer 2 on the axle 5 (at fixed position) so as to retract the fasteners 4, the tires 6 and the roller holder 1 outwardly (direction B) as shown in dotted line of FIG. 5, thereby dismantling the tires 6 on the holder 1.

For easy operation of the present invention, the bolt bracket 14 is formed with two pivots 141 on its two opposite ends pivotally secured to the U-shaped frame 13. For adjusting the height of the bracket 14 and bolt 3, the height-adjusting means 15 includes a pair of sliding blocks 150 each block pivotally secured with one end of the bracket 14 and slidably held on two columns of the U-shaped frame 13, a pair of adjusting screws 151 each screw engageable with each sliding block 150 for operatively raising or lowering the block 150 and a pair of adjusting wheels 152 for rotating the screws 151 for adjusting the height of the blocks 150 and bracket 14 secured thereon.

The rollers 12 for supporting the platform 11 of the holder 1 are each provided with an adjusting wheel 121 for adjusting a horizontal level of the holder 1.

In assembling the tires 6 onto a car axle, the holder 1 loaded with tires 6 is moved towards the axle 5 and the driving handle 37 is rotated counterclockwise (direction R4) to forward the bolt 3 and screw 25 outwardly to engage the hook end portions 41 of the trifurcate plate 21 of the axle retainer 2 with the shoulder 54 of the axle socket 53. Further rotation of the driving handle 37 in direction R4, the holder 1 and the held tires 6 will be pushed towards the axle 5 to be finally secured on the axle 5.

Accordingly, this invention provides an apparatus for dismantling tires from a car or setting tires onto a car very safely, conveniently, and efficiently.

I claim:
1. A tire dismantling and setting means comprising:
   a roller holder for loading or holding tires thereon having rollers supporting said holder on a floor;
   an axle retainer engageable with a shoulder inside an axle socket formed on an outer portion of a car axle;
   a driving bolt rotatably engageable with said axle retainer having male threads formed on said bolt rotatably engageable with a female-threaded hole formed in a bracket of said holder; and
   a pair of tire fasteners each fastener adjustably fastening a tire on said holder, whereby upon a clockwise rotation of said driving bolt to urge said bolt and said axle retainer rearwardly to force said axle retainer on the outer portion of the axle to retract said bracket of said bolt and said tire fasteners of said roller holder, the tires fastened by said fasteners will be conveniently dismantled to be held on said roller holder.

2. A tire dismantling and setting means according to claim 1, wherein said roller holder includes: a platform having said rollers supporting the platform on a floor, a U-shaped frame vertically fixed on the platform, and said bracket for rotatably securing said driving bolt thereon being pivotally secured on the U-shaped frame.

3. A tire dismantling and setting means according to claim 2, wherein said bracket for securing said driving bolt is pivotally secured on two sliding blocks each sliding block slidably mounted on two columns of said U-shaped frame, each said sliding block being adjusted its height on said U-shaped frame by an adjusting screw engaged with the block and an adjusting wheel secured with the adjusting screw.

4. A tire dismantling and setting means according to claim 1, wherein said axle retainer includes: a trifurcate plate having its one end secured to a retainer disk and having its another end formed with hook end portions engageable with a shoulder portion of an axle socket, a retainer screw having male threads formed thereon rotatably engageable with a female-threaded hole formed in said retainer disk, an actuating head portion secured on a rear end of said retainer screw formed with a truncated cone portion having a sloping surface tapered towards said retainer disk, and a retainer socket portion detachably mounted with a retainer handle for rotating the retainer screw to extend said trifurcate plate to engage said shoulder portion of the car axle.

5. A tire dismantling and setting means according to claim 4, wherein said retainer socket portion of said axle retainer is formed with a cylindrical hole therein and an annular groove recessed from said cylindrical hole.

6. A tire dismantling and setting means according to claim 1, wherein said driving bolt includes: a male-threaded portion formed thereon rotatably engageable with a central female-threaded hole formed in said bracket of said roller holder, a hollow plug formed on a rear end of said bolt detachably engageable with the cylindrical hole in said retainer socket portion having a plurality of balls radially held in a plurality of ball holes formed through said plug, an inner male-threaded rod formed in said bolt having a coupling plunger formed on a rear end of the male-threaded rod operatively urging said balls to couple said hollow plug with said retainer socket portion so as to rotatably couple said axle retainer with said bolt and having a knob formed on a front outer of said male-threaded rod for rotating said rod, and a driving handle formed on a front end portion of said bolt for driving said bolt on said bracket of said holder.

7. A tire dismantling and setting means according to claim 6, wherein said coupling plunger includes a cone portion tapered rearwardly and a cylindrical body slidably engageable with a cylindrical hole formed in said hollow plug, said cone portion of said plunger operatively urging said balls outwardly for coupling said plug and said retainer socket portion.

8. A tire dismantling and setting means according to claim 1, wherein each said tire fastener includes a fastening hook portion formed on a rear end of a fastener rod, engageable with a wheel disk through a disk hole of a tire, a male-threaded portion formed on an outer portion of the fastener rod adjustably fixed in a slot formed in said bracket, and a fastening wheel rotatably engageable with said male-threaded portion on said fastener rod for adjustably limiting said fastener rod on said bracket for fastening a tire on said roller holder.

* * * * *